(12) United States Patent
Cai et al.

(10) Patent No.: US 8,862,460 B2
(45) Date of Patent: Oct. 14, 2014

(54) SYSTEM, METHOD, AND PROGRAM FOR PROCESSING TEXT USING OBJECT COREFERENCE TECHNOLOGY

(75) Inventors: Keke Cai, Beijing (CN); Rui Ma, Beijing (CN); Zhong Su, Beijing (CN); Xiao Xun Zhang, Beijing (CN); Hui Jia Zhu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 693 days.

(21) Appl. No.: 13/116,091

(22) Filed: May 26, 2011

(65) Prior Publication Data
US 2011/0295594 A1    Dec. 1, 2011

(30) Foreign Application Priority Data
May 28, 2010    (CN) .......................... 2010 1 0188623

(51) Int. Cl.
*G06F 17/28*    (2006.01)

(52) U.S. Cl.
USPC .............................................................. 704/9

(58) Field of Classification Search
USPC ....................................................... 704/1–10
See application file for complete search history.

(56) References Cited

U.S. PATENT DOCUMENTS

| | | | |
|---|---|---|---|
| 4,580,218 A * | 4/1986 | Raye ................................ 704/1 |
| 6,076,054 A | 6/2000 | Vysotsky et al. | |
| 6,243,677 B1 | 6/2001 | Arslan et al. | |
| 6,438,543 B1 | 8/2002 | Kazi et al. | |
| 6,609,091 B1 * | 8/2003 | Budzinski .......................... 704/9 |
| 2003/0191760 A1 * | 10/2003 | Cameron et al. .................. 707/5 |
| 2005/0108001 A1 * | 5/2005 | Aarskog .......................... 704/10 |
| 2006/0036866 A1 | 2/2006 | Nagendra et al. | |
| 2008/0201361 A1 | 8/2008 | Castro et al. | |
| 2009/0043755 A1 * | 2/2009 | Faris et al. ........................ 707/5 |
| 2009/0076799 A1 | 3/2009 | Crouch et al. | |
| 2009/0083140 A1 | 3/2009 | Phan | |
| 2010/0042424 A1 | 2/2010 | Turakhia | |

FOREIGN PATENT DOCUMENTS

| | | |
|---|---|---|
| CN | 1940930 | 4/2007 |
| CN | 1954321 | 4/2007 |
| CN | 101702944 | 5/2010 |

* cited by examiner

*Primary Examiner* — Abul Azad
(74) *Attorney, Agent, or Firm* — Cantor Colburn LLP (57) ABSTRACT

System, method and program product for text processing using object coreference technology. In particular, the invention provides a text processing method which includes, acquiring text to be processed; extracting subject words and entity words corresponding to the subject words from the text; grouping the subject words; determining entity words that reference a same concerned object according to the grouped subject words; and generating processing policy for entity words that reference a same concerned object. The invention also includes a system with means for carrying out the method. The invention generally realizes automatic, more comprehensive, accurate, efficient analysis and processing on text data. The invention can be used to dig a large amount of comment data about some entity, and the invention can also be used to suggest insertion place in an article where embedded advertisement is inserted.

18 Claims, 5 Drawing Sheets

My Blog

May 11, 2010    sunny

... ... many people take photos one after another by using camera in the scenic spot. I also could not help taking out the camera to take photos, performance of our camera is quite good, and effect of the photo is excellent, my little daughter always grab the camera to take photo of these small animals... ...

Fig. 3A

My Blog

May 11, 2010    sunny

... ... many people take photos one after another by using camera in the scenic spot. I also could not help taking out the five star camera to take photos, performance of our five star camera is quite good, and effect of the photo is excellent, my little daughter always grab the camera to take photo of these small animals... ...

Fig. 3B

My Blog

May 11, 2010    sunny

... ... many people take photos one after another by using camera in the scenic spot. I also could not help taking out FS camera to take photos, performance of our FS camera is quite good, and effect of the photo is excellent, my little daughter always grab the camera to take photo of these small animals... ...

Fig. 3C

My Blog

May 11, 2010 — sunny

... ... many people take photos one after another by using camera in the scenic spot. I also could not help taking out the camera to take photos, performance of our camera is quite good, and effect of the photo is excellent, my little daughter always grab the camera to take photo of these small animals... ...

Fig. 3D

My Blog

May 11, 2010 — sunny

... ... many people take photos one after another by using camera in the scenic spot. I also could not help taking out the camera to take photos, performance of our camera is quite good, and effect of the photo (taken by our five star camera) is excellent, my little daughter always grab the camera to take photo of these small animals... ...

Fig. 3E

My Blog

May 11, 2010 — sunny

... ... signal of the just bought mobile phone is very poor, it always can be heard clearly... ...

Fig. 3F

My Blog

May 11, 2010   sunny

……I just asked somebody to buy a five star camera from HongKong, which is much better than the camera I used before……

Fig.3G

My Blog

May 11, 2010   sunny

……I've just bought a five star camera……my new camera is much better to use than the old one, it can continuously take photos……

SYSTEM, METHOD, AND PROGRAM FOR PROCESSING TEXT USING OBJECT COREFERENCE TECHNOLOGY

CROSS REFERENCE TO RELATED APPLICATIONS

This application claims priority under 35 U.S.C. §119 to Chinese Patent Application No. 201010188623.8.0 filed May 28, 2010, the entire contents of which are incorporated herein by reference.

BACKGROUND OF THE INVENTION

1. Field of the Invention

The invention generally relates to a method and system for processing data, in particular, to a method and system for processing text by using object coreference technology.

2. Description of Related Art

Data mining is a step in database knowledge discovery. Data mining generally refers to a process for automatically searching in a large amount of data for information hidden therein that has special relationality. Data mining and data analysis are important research subjects in field of information technology, upon which many sub research subjects exist. Information extraction research in natural language processing technology has provided people with a more powerful information retrieving tool to cope with the severe challenge brought by information explosion. Information extraction technology does not attempt to comprehensively understand the whole document; it simply analyzes the part containing relevant information in the document. Object coreference technology is one type of application in information extraction research, which can confirm coreference relationship in text in some degree.

In current natural language processing technology, object coreference is mainly used to analyze character coreference. For example, for a segment of text "mayor zhang visited the newly-built museum today . . . the mayor talked with staff of the museum with interest . . . he carefully asked relevant situation . . . ", traditional natural language processing technology can determine that "mayor zhang", "mayor" and "he" refer to a same person. U.S. Pat. No. 6,438,543 B1 has disclosed a method of retrieving a same subject having different names in multiple pieces of article. Specification of that patent has specifically introduced how to judge that Clinton at different positions refers to a same person.

SUMMARY

The present invention provides a text processing method, including: acquiring text to be processed; extracting subject words and entity words corresponding to the subject words from the text; grouping the subject words to form subject word groups; determining entity words that reference a same concerned object according to the subject word groups; and generating processing policy for entity words that reference a same concerned object. Also provided is an article of manufacture tangibly embodying computer readable instructions which, when implemented, cause a computer to carry out the steps of the above text processing method.

The present invention also provides a text processing system, including a text acquiring means for acquiring text to be processed; a word extracting means for extracting subject words and entity words corresponding to the subject words from the text; a subject word grouping means for grouping the subject words to form subject word groups; an entity word determining means for determining entity words that reference a same concerned object according to the subject word groups; and a processing policy generating means for generating processing policy for entity words that reference a same concerned object.

BRIEF DESCRIPTION OF DRAWINGS

The accompany drawings referenced in the description are merely used to illustrate typical embodiments of the invention and should not be considered as limitation to the scope of the invention.

DETAILED DESCRIPTION OF THE PREFERRED EMBODIMENTS

In the following discussion, a large amount of specific details are provided to facilitate to understand the invention thoroughly. However, for those skilled in the art, it is evident that it does not affect the understanding of the invention without these specific details. And it will be recognized that, the usage of any of following specific terms is just for convenience of description, thus the invention should not be limited to any specific application that is identified and/or implied by such terms. In field of data mining, realizing object coreference on entity word can be helpful for resolving many actual problems. The invention generally realizes automatic, comprehensive, accurate, efficient analysis and processing on text data by using object coreference technology. For example, a camera manufacture wishes to acquire user's various comments on its product through analyzing a large number of articles on the network. Assume "Five Star" is a brand for a camera, an e-pal writes in a Blog that "I've just bought a five star camera . . . my new camera is much better to use than the old one, it can continuously take photos . . . ". Without the benefit of the current invention, it is hard to know that the "new camera" mentioned afterwards is just the "five star camera" described before, and thus it is hard to dig out the comment on the "five star camera", namely, "it can continuously take photos". Again, the Five Star Company can wish to insert embedded advertisement in that e-pal's article. For example, if it is mentioned in that e-pal's article that " . . . many people take photos one after another by using camera in the scenic spot. I also could not help taking out the camera to take photos, performance of our camera is quite good, and effect of the photo is excellent, my little daughter always grab the camera to take photo of these small animals . . . ", the camera manufacturer can absolutely insert embedded advertisement without affecting integrity of the article. Of course, the above two examples merely illustrate some application scenarios of the invention; actually, more application possibilities can be developed on basis of the invention. The invention generally realizes automatic, more comprehensive, accurate, efficient analysis and processing on text data by using extension to existing object coreference technology.

Figure 1:
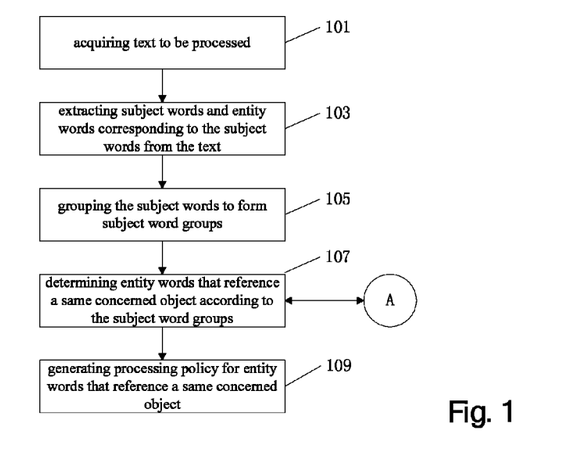
FIG. 1 illustrates an overall flowchart of a text processing method according to an embodiment of the invention.

FIG. 1 illustrates an overall flowchart of a text processing method. At step 101, text to be processed is acquired. The text can be one or multiple pieces of articles. The multiple pieces of text can originate from a same author (e.g., multiple pieces of blogs of a same author) or different authors. The text can be acquired via public channel (such as blog, forum, personal web page disclosed on internet) or private channel (such as acquired from a private database through manner of license). With respect to the technical aspect, the invention has no limitation on type of the text to be processed, which can be any type such as blog, novel, news etc., and the invention has no limitation on storage format of the text to be processed, which can be any document format such as xml document, html document, word document etc.

Figure 3A:
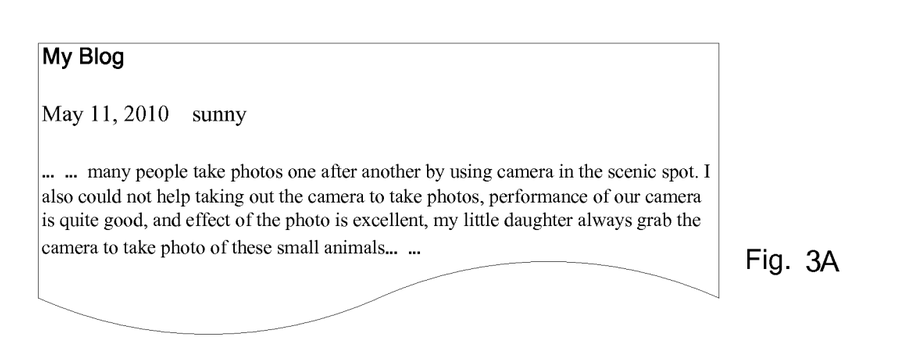
FIG. 3A illustrates an example of a piece of text according to an embodiment of the invention.

At step 103, subject words and entity words corresponding to the subject words are extracted from the text. Extracting subject word can be realized through subject word detection (also called subject word recognition) technology. The subject word is a word that represents one or more subject concepts; the subject concept can either locate at subject part, or locate at object part or other part of a sentence. Taking the text in FIG. 3A for example, it is described in the blog that "many people take photos one after another by using camera in the scenic spot. I also could not help taking out the camera to take photos, performance of our camera is quite good, and effect of the photo is excellent, my little daughter always grab the camera to take photo of these small animals . . . ". In which "many people", "I", "our" and "little daughter" are all words that represent subject concept. The subject concept includes character subject as well as organization subject, for example, "restaurant ABC" in "tableware of restaurant ABC is very unique" can also be extracted. Of course, various rules can be set to limit the extracted subject words based on need of application, such as, only character subject word can be extracted, only subject word in subject can be extracted, and so on.

In addition to extract subject words, entity words corresponding to the subject words also need to be extracted. The entity words can be extracted by utilizing named entity recognition technology. The entity word is a word that represents one or more entity concepts, for example, "camera" in the example of FIG. 3A. Of course, various rules can be set to limit the extracted entity words based on need of application, for example, only entity word within a certain category is extracted (in particular, only IT product related entity word is extracted), or only entity word that relates to one or one type of concerned object is extracted (in particular, only camera related entity word is extracted), or all entity words will be extracted.

At step 105, the subject words are grouped to form subject word groups. The invention creatively utilizes a method of grouping subject words, so as to determine entities that reference a common concerned object and related to different subjects. To group the subject words, a subject relationship network needs to be established first, according to different application requirements, a personal relationship network, a family relationship network, a colleague relationship network, a friend relationship network etc. can be established, and then the subject words are grouped according to the established subject relationship network. The subject relationship network can be established according to concerned object. For example, for objects such as camera, car, house, in most cases they are owned or used in unit of family, for objects such as mobile phone, jewelry, in most cases they are owned or used by individual, while for objects such as printer, server, projector, they can be owned or used by workplace. Different rules can be set based on need of actual application so that different concerned objects will be grouped according to different relationship networks. Taking FIG. 3A for example, since the concerned object in this example is a camera, the subject words can be grouped in unit of family by using the family relationship network, the grouping result is as follows:

{"many people"}, {"I", "our", "my little daughter"} wherein group 1 includes a subject word "many people"; group 2 includes three subject words "I", "our", "my little daughter". It is appreciated that, if only "little daughter" is appeared in FIG. 3A and "my little daughter" is not appeared, and it is mentioned in the context that "little daughter" is my little daughter, then "little daughter" can also be categorized into group 2 at step 105.

The concerned object can be acquired via many channels; the concerned object can be acquired by receiving a concerned object list containing at least one concerned object. According to one application scenario (first application scenario) of the invention, the text processing method can be used to dig out a large amount of comment data about a certain entity. For example, if a camera manufacturer (a five star company) wishes to learn user's comment about its product through network, then it can collect a large number of articles discussing five star camera on network and extract sentence or phrase about five star camera through the method of the invention. In this application scenario, the concerned object in the concerned object list is five star camera.

In another application scenario (second application scenario) of the invention, the text processing method can also be used to recommend insertion position where embedded advertisement is inserted in an article. If there is a plurality of manufactures that wish to insert embedded advertisement in other people's article, then the concerned object list will contain a plurality of concerned objects including camera, mobile phone, car etc. In this application scenario, object in the concerned object list can not necessarily be product of a certain brand, that is, if camera is mentioned in one's blog but brand of the camera is not specifically mentioned, then a camera manufacture can insert embedded advertisement upon his agreement.

The concerned object can also be determined based on analysis of grammatical structure of the text. The concerned object can be acquired by utilizing OOV (Out of Vocabulary) technology. The invention has no limitation on implementation of OOV technology and reference can be made to patent literature such as U.S. Pat. No. 6,243,677B1, U.S. Pat. No. 6,076,054 and non-patent literature, for example. In the second application scenario of the invention, a network service platform provider can not have a clear concerned object list; rather, it wishes to dig out a product on network into which embedded advertisement can be inserted through the text processing method. With OOV technology, product name of a concerned object can be determined by analyzing grammatical structure of the text, including identify key verb therein. For example, if someone writes in a network blog that "I buy a fashionable mp4 today", then the OOV technology can determine product name "mp4" of the concerned object by analyzing key verb "buy" therein.

According to one embodiment of the invention, noun extension can be performed on at least one concerned object by utilizing alias in natural language processing technology. The invention has no limitation on implementation of alias and reference can be made to patent literature such as US20060036866A1 and non-patent literature, for example. Alias technology realizes extension to different names of a same product by analyzing a large number of documents and abbreviation convention between words. Generally, one concerned object can have several synonym, for example, "camera, DC, single lens reflex" all refer to camera, and "mobile phone, handset, cordless telephone, wireless phone" all refer to mobile phone. Information about one or more types of product in text can be more comprehensively dug out with alias technology.

At step 107, entity words that reference a same concerned object are determined according to the subject word groups. Camera can be mentioned multiple times in an article, but not all cameras necessarily refer to a same camera. In the example shown in FIG. 3A, "camera" in "many people take photos one after another by using camera" is not the same "camera" in "I also could not help taking out the camera to take photos". Step 107 can determine entity words that reference a same camera in the article. According to the first application scenario described above, the Five Star Company only wants to know comment about five star camera, the text processing method of the invention can help the Five Star Company to identify all comments about its camera in the article. According to the second application scenario described above, the network service platform provider can help a manufacture to insert embedded advertisement at appropriate position. Detailed steps will be described below.

At step 109, processing policy is generated for entity words that reference a same concerned object. Details of generating processing policy can vary with different application scenarios and actual needs. For the first application scenario described above, the step of generating processing policy for entity words that reference a same concerned object can further extract sentence or phrase where the entity words that reference a same concerned object reside. For example, as shown in FIG. 3H, for "I've just bought a five star camera . . . my new camera is much better to use than the old one, it can continuously take photos . . . ", the sentence "my new camera is much better to use than the old one, it can continuously take photos" can be extracted as specific comment on this type of five star camera, of course, the phrase "it can continuously take photos" can also be extracted as specific comment on this type of five star camera. The invention can further perform emotion classification on the extracted sentence or phrase. With emotion analysis technology, the invention can classify the extracted comments, for example, into positive comment and negative comment, so as to provide a comment report with more readability.

According to the second application scenario described above, the step of generating processing policy for entity words that reference a same concerned object can further generate amendment suggestions for at least two entity words that reference a same concerned object. The amendment suggestions can be stored in another file, or can be stored as track change on basis of original text.

According to an embodiment of the invention, the step of generating amendment suggestions further includes: generating amendment suggestions according to occurrence positions of the at least two entity words that reference a same concerned object in the text. As a simple implementation, advertisement brand can be added before an entity word that reference a same concerned object each time the entity word occurs. However, to prevent addition of embedded advertisement from affecting fluency of original text, in one embodiment of the invention, some rules can be set so as to decide whether amendment suggestion will be generated for an entity word according to position of the entity word in text. These rules can include one or more of the following: if multiple entity words that reference a same concerned object occur in a same sentence, then embedded advertisement is only inserted at position where the first entity word occurs; if multiple entity words that reference a same concerned object occur in a same paragraph, then embedded advertisement is only inserted at position where the first entity word occurs; if multiple entity words that reference a same concerned object occur in a same piece of text, then embedded advertisement is inserted once every N+1 entity words, wherein N is greater than or equals to 1. In addition to the above, any other rules can be formulated according to actual application needs.

According to an embodiment of the invention, the step of generating amendment suggestions further includes: generating amendment suggestions according to emotion analysis result of the at least two entity words that reference a same concerned object. Sentence or phrase where entity word that references a same concerned object reside can be analyzed by using emotion analysis technique, if what is expressed by the sentence or phrase is negative comment on the concerned object, then amendment suggestion will not be generated for that entity word or it is suggested that no amendment is made. As shown in FIG. 3F, negative comment "signal of the just bought mobile phone is very poor, it always can be heard clearly" on mobile phone occurs in the text, so amendment suggestion will not be proposed or it is suggested that no amendment is made.

Figure 3B:
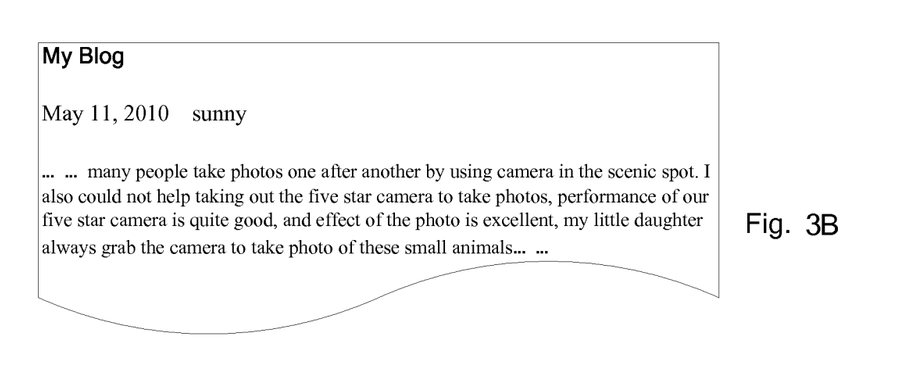
FIG. 3B-3G illustrate examples of some processing results obtained by processing the example in FIG. 3A with the text processing method and system according to an embodiment of the invention.
Figure 3C:
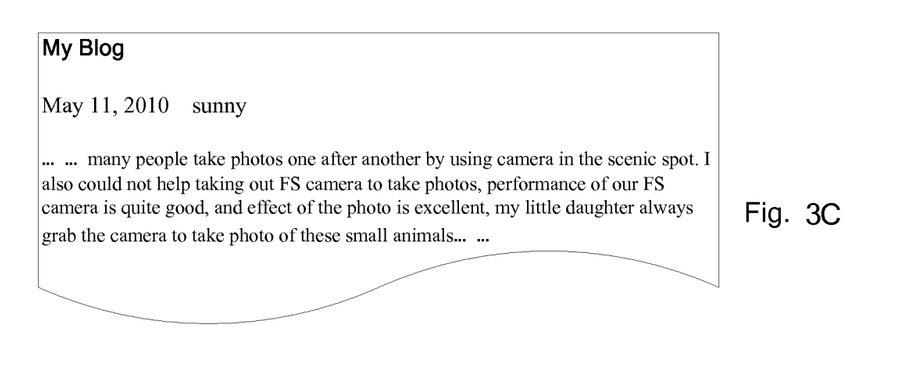
Figure 3D:
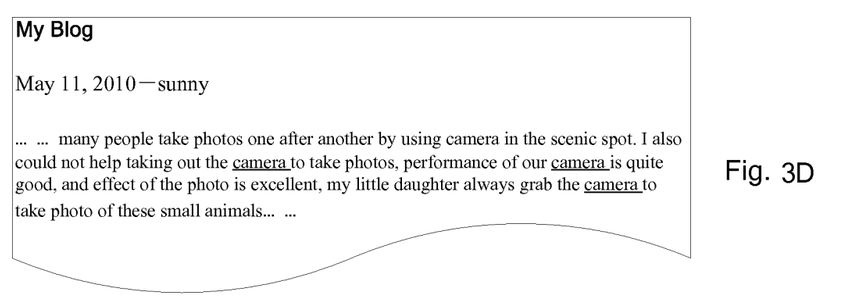

Amendment in the amendment suggestions includes at least one of the following: substituting another word for at least two entity words that reference a same concerned object, for example, in FIG. 3B, "five star camera" is used to replace "camera" in "I also could not help taking out the camera to take photos" and "performance of our camera is quite good"; inserting a same icon for at least two entity words that reference a same concerned object, for example, in FIG. 3C, an icon "FS" is inserted before "camera" in "I also could not help taking out the camera to take photos" and "performance of our camera is quite good"; adding a same link for at least two entity words that reference a same concerned object, for example, in FIG. 3D, hyperlinks are added for "camera" in "I also could not help taking out the camera to take photos", "performance of our camera is quite good" and "my little daughter always grab the camera to take photo of these small animals". Of course, the invention is not limited to any of the above one or more amendment schemes, more amendment schemes can be devised according to actual application needs.

Figure 3E:
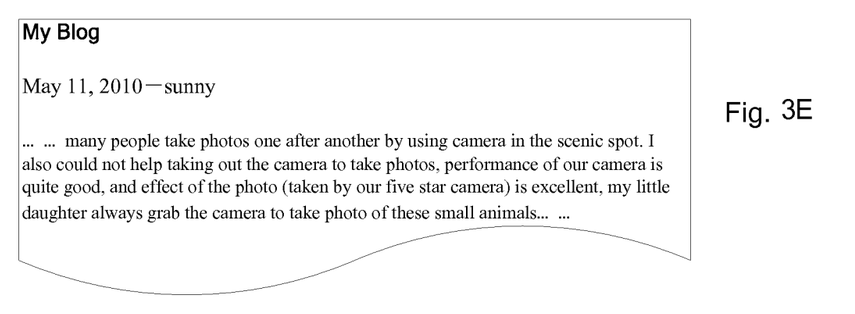
Figure 3F:
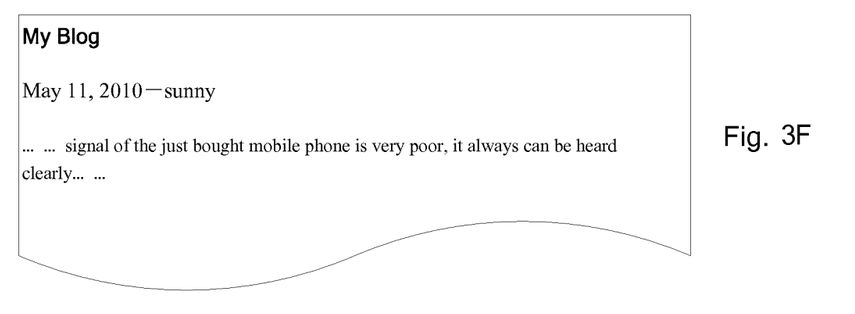

According to an embodiment of the invention, implicit advertisement can also be inserted by using associated entity word. The so-called associated entity word refers to an entity word that has association relationship with the above described entity word that references a same concerned object. For example, "photo" in "many people take photos one after another by using camera in the scenic spot. I also could not help taking out the camera to take photos, performance of our camera is quite good, and effect of the photo is excellent, my little daughter always grab the camera to take photo of these small animals" is an associated entity word for "camera". An example of amending associated entity word can be seen in FIG. 3E "effect of the photo (taken by our five star camera) is excellent". To make the above amendment to associated entity word, associated entity word of at least two entity words that reference a same concerned object needs to be identified first, and then process is performed on the associated entity word. Identification of associated entity word can be accomplished by matching a given entity word list that has association relationship with concerned object (for example, photo, film etc. all belong to associated entity word of camera), or associated entity word can be acquired by analyzing the text with natural language processing technology.

Figure 2:
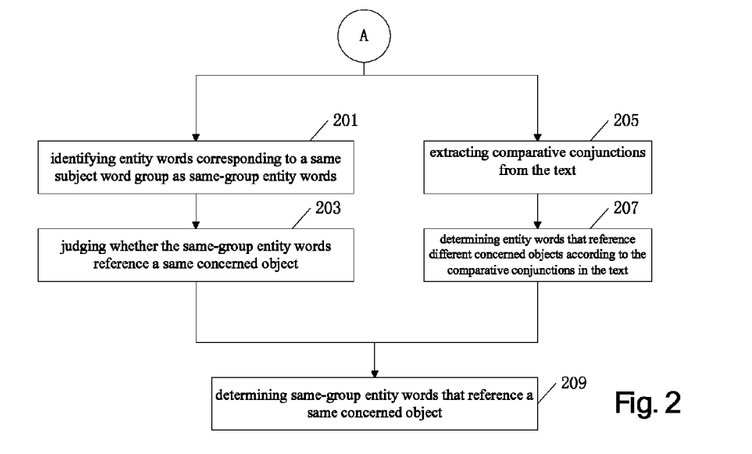
FIG. 2 illustrates a flowchart of determining entity words that reference a same concerned object according to an embodiment of the invention according to an embodiment of the invention.

FIG. 2 illustrates a flowchart of determining entity words that reference a same concerned object according to an embodiment of the invention. The main purpose of steps 201 and 203 is to determine same-group entity words that reference a same concerned object, and the main purpose of steps 205 and 207 is to exclude same-group entity words that reference a same concerned object. Therefore, steps 201, 203 and 205, 205 can be two sets of steps that are executed in parallel, or can be two sets of steps that are executed in success, if executed in success, either steps 201, 203 are executed before steps 205, 207, or steps 205, 207 are executed before steps 201, 203. FIG. 2 just performs illustration by taking one execution sequence for example.

At step 201, entity words corresponding to a same subject word group are identified as same-group entity words. The step further includes: performing analysis on grammatical structure of the text so as to identify entity words corresponding to each subject word that belongs to a same subject word group. Taking the text in FIG. 3A for example, the step 201 identifies entity words corresponding to all subject words in subject word group {"I", "our", "my little daughter"}, for example, "camera" in "I also could not help taking out the camera to take photos", "camera" in "performance of our camera is quite good" and "camera" in "my little daughter always grab the camera to take photo of these small animals".

At step 203, it is judged whether the same-group entity words reference a same concerned object, in the above example, "camera" at the three positions just all reference a same concerned object. However, during actual processing, there can also be cases that same-group entity words reference different concerned objects, for example, if one more sentence "my little daughter always like to wear a sunhat" is added to the example of FIG. 3A, then obviously, "sunhat" and "camera" reference different concerned objects.

If in the foregoing step of extracting entity words (see step 103 in FIG. 1), only entity words that related to one concerned object (e.g., camera) are extracted, then the step 203 herein can also be omitted.

As mentioned above, according to one embodiment of the invention, noun extension can be performed on at least one concerned object by using alias in natural language processing technology, so the step of judging whether the same-group entity words reference a same concerned object can further includes: judging whether the same-group entity words match with the extended at least one concerned object.

At step 209, same-group entity words that reference a same concerned object are determined. In case that steps 205 and 207 are not executed, same-group entity words that reference a same concerned object can also be determined, however, some erroneous judgment can be introduced in actual effect. So step 205 and 207 can help to make the determined same-group entity words that reference a same concerned object more accurate.

Figure 3G:
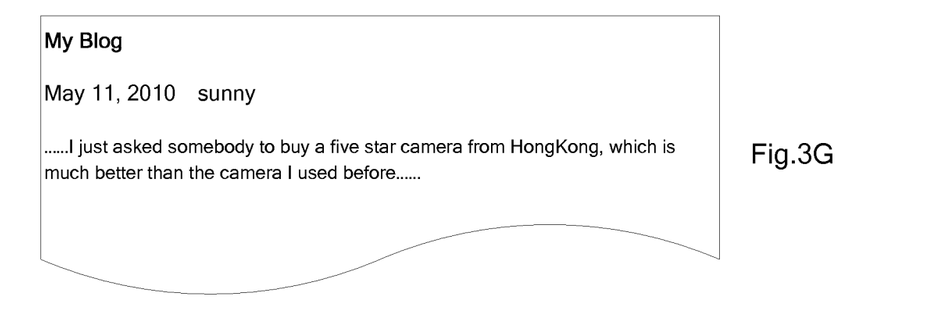
Figure 3H:
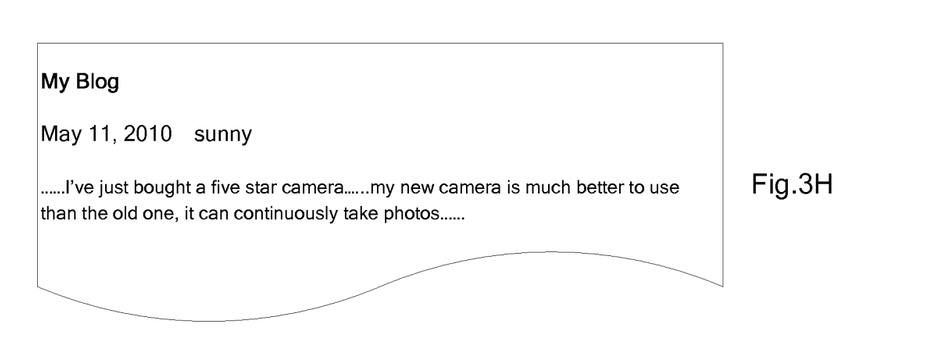
FIG. 3H illustrates an example of another piece of text according to an embodiment of the invention.

At step 205, comparative conjunctions are extracted from the text. The comparative conjunctions can include "than", "relative to", "over" etc. At step 207, entity words that reference different concerned objects are determined according to the comparative conjunctions in the text. For example, a comparative conjunction "than" occurs in text "I just asked somebody to buy a camera from Hong Kong, which is much better than the camera I used before", so it can be determined that "camera" in "I just asked somebody to buy a camera from Hong Kong" and "camera" in "than the camera I used before" reference different concerned objects. For the second application scenario described above, process can only be performed on the first "camera" to insert embedded advertisement, such as "I just asked somebody to buy a five star camera from Hong Kong, which is much better than the camera I used before" shown in FIG. 3G. For the first application scenario described above, sentence or phrase where entities that reference a same concerned object reside is extracted as comment on the concerned object, e.g., only "it can continuously take photo" in the text of FIG. 3H is extracted as comment on "five star camera" in "I've just bought a five star camera".

Figure 4:
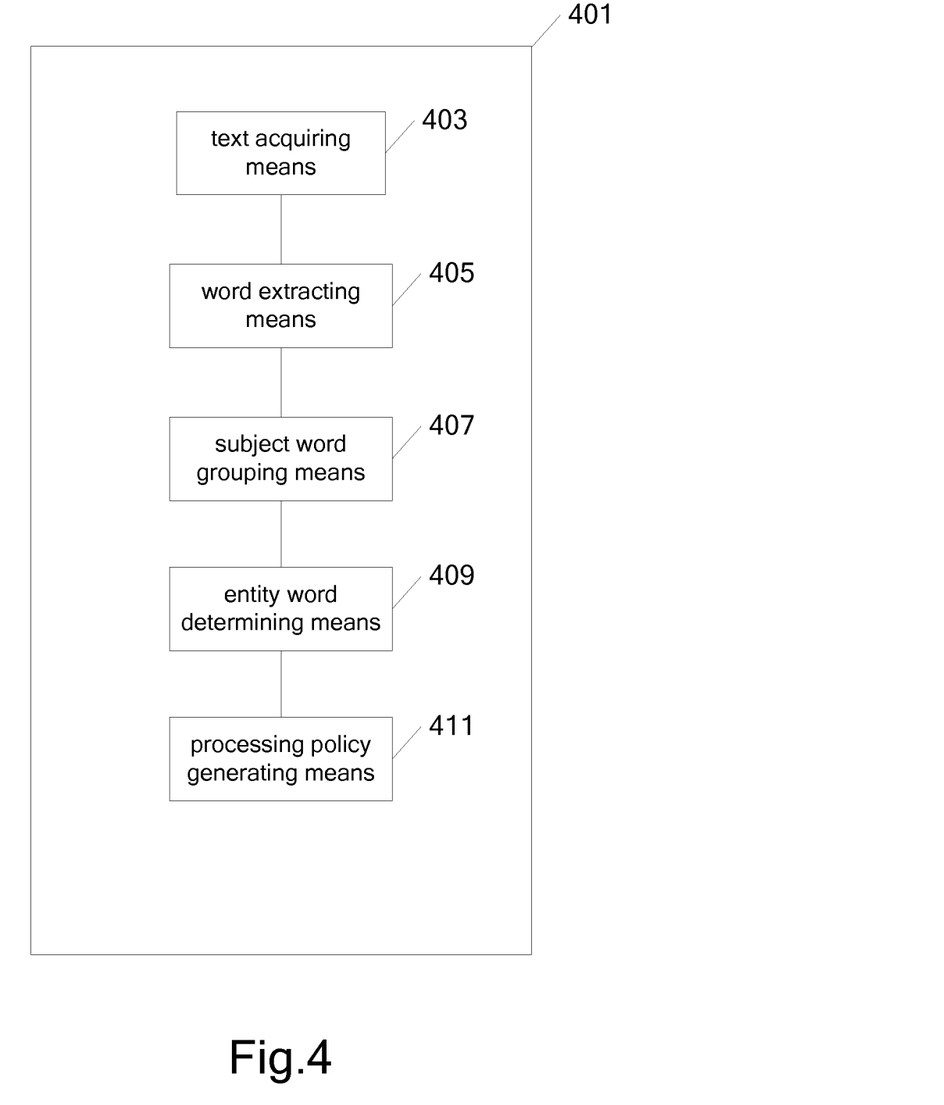
FIG. 4 illustrates an overall block diagram of a text processing system according to an embodiment of the invention.

FIG. 4 illustrates an overall block diagram of a text processing system. The text processing system 401 including: a text acquiring means 403 for acquiring text to be processed; a word extracting means 405 for extracting subject words and entity words corresponding to the subject words from the text; a subject word grouping means 407 for grouping the subject words; an entity word determining means 409 for determining entity words that reference a same concerned object according to the grouped subject words; and a processing policy generating means 411 for generating processing policy for entity words that reference a same concerned object. Steps executed by the means correspond to respective steps in FIG. 1 and description of which will be omitted.

The entity word determining means 409 is further configured for: identifying entity words corresponding to a same subject word group as same-group entity words; judging whether the same-group entity words reference a same concerned object; and determining the same-group entity words that reference a same concerned object. The above functions executed by the entity word determining means 409 correspond to respective steps in FIG. 2 and description of which will also be omitted.

The entity word determining means 409 is further configured for: extracting comparative conjunctions from the text; and determining entity words that reference different concerned objects according to the comparative conjunctions in the text. With the above functions, accuracy of the determined entity words that reference a same concerned object can be improved.

The text processing system 401 further includes an extending means (not shown) for performing noun extension on at least one concerned object, with the extending means, entity words that reference a same concerned object but use different names can further be identified.

The processing policy generating means 411 is further configured for: generating amendment suggestions for at least two entity words that reference a same concerned object. This function can enable the invention to insert embedded advertisement for the second application scenario described above. The processing policy generating means 411 is further configured for: extracting sentence or phrase where the entity words that reference a same concerned object reside. This function can enable the invention to collect comment information about certain product for the first application scenario described above.

Other functions executed by the text processing system of the invention are similar to corresponding functions executed by the above text processing method and description of which will be omitted.

As will be appreciated by one skilled in the art, the present invention can be embodied as a system, method or computer program product. Accordingly, the present invention can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, the present invention can take the form of a computer program product embodied in any tangible medium of expression having computer usable program code embodied in the medium.

Any combination of one or more computer usable or computer readable medium(s) can be utilized. The computer-usable or computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium can be any medium that can contain, store, communicate, propagate, or transport the program for use by or in connection with the instruction execution system, apparatus, or device. The computer-usable medium can include a propagated data signal with the computer-usable program code embodied therewith, either in baseband or as part of a carrier wave. The computer usable program code can be transmitted using any appropriate medium, including but not limited to wireless, wire line, optical fiber cable, RF, etc.

Computer program code for carrying out operations of the present invention can be written in any combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions can also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which includes one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", and "the" are intended to include the plural forms as well, unless the context clearly indicates otherwise. It will be further understood that the terms "comprises" when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. The scope of the following claims is to be accorded the broadcast interpretation so as to encompass all such modifications and equivalent structures and functions.

That which is claimed is:

1. A computer-implemented method for processing text, comprising:
   acquiring text to be processed;
   extracting subject words and entity words corresponding to the subject words from the text;
   establishing, by a computer, a subject relationship network according to a concerned object, to group the subject words into different subject word groups;
   identifying at least two of the extracted entity words that reference a same concerned object based on the different subject word groups; and
   generating amendment suggestions according to occurrence positions of the identified entity words that reference the same concerned object in order to insert embedded advertisement to the text.

2. A method according to claim 1, wherein identifying the entity words comprises:
   identifying a group of entity words corresponding to a same subject word group; and
   determining whether each entity word in the group of entity words references the same concerned object.

3. A method according to claim 2, wherein identifying the group of entity words comprises:
   identifying an entity word corresponding to each subject word that belongs to the same subject word group.

4. A method according to claim 2, further comprising:
   performing noun extension on the concerned object, and
   wherein determining whether each entity word in the group of entity words references the same concerned object comprises:
   determining whether each entity word in the group of entity words matches with the extended concerned object.

5. A method according to claim 1, wherein identifying the entity words comprises:
   extracting a comparative conjunctions from the text; and
   identifying different entity words that reference different concerned objects according to the comparative conjunctions in the text.

6. A method according to claim 1, wherein generating amendment suggestions for the identified entity words comprises:
   generating amendment suggestions according to occurrence positions of the identified entity words in the text.

7. A method according to claim 1, wherein generating amendment suggestions for the identified entity words comprises:
   generating amendment suggestions according to an emotion analysis result of the identified entity words that reference the same concerned object.

8. A method according to claim 1, wherein the amendment suggestions comprise at least one of the following:
   substituting another word for at least one of the identified entity words;
   inserting a same icon for the identified entity words; and
   adding a same link for the identified entity words.

9. A method according to claim 1, further comprising:
   receiving a concerned object list containing at least one concerned object therein.

10. A method according to claim 1, further comprising:
    determining at least one concerned object according to an analysis of a grammatical structure of the text.

11. A method according to claim 1, further comprising:
    identifying an associated entity word of the identified entity words; and
    processing the associated entity word.

12. A method according to claim 1, further comprising:
    extracting a sentence or a phrase where at least one of the identified entity words resides.

13. A method according to claim 12, further comprising:
    performing an emotion classification on the extracted sentence or phrase.

14. A text processing system, comprising:
    a text acquiring means configured to acquire text to be processed;
    a word extracting means configured to extract subject words and entity words corresponding to the subject words from the text;
    a subject word grouping means configured according to a subject relationship network based on a concerned object, to group the subject words into different subject word groups;
    an entity word determining means configured to identify at least two of the extracted entity words that references a same concerned object based on the different subject word groups; and
    a processing policy generating means configured to generate amendment suggestions according to occurrence positions of the identified entity words that reference the same concerned object in order to insert embedded advertisement to the text.

15. A system according to claim 14, wherein the entity word determining means is further configured to:
    identify a group of entity words corresponding to a same subject word group;
    determine whether each entity word in the group of entity words references the same concerned object;
    extract a comparative conjunctions from the text; and
    identify different entity words that reference a different concerned object according to the comparative conjunctions in the text.

16. A system according to claim 15, further comprising:
    an extending means configured to perform noun extension on the concerned object.

17. A system according to claim 14, wherein the processing policy generating means is further configured to:
    extract a sentence or a phrase where at least one of the identified entity words resides.

18. An article of manufacture tangibly embodying computer readable instructions which, when implemented, cause a computer to carry out the steps of a text processing method, comprising:
    acquiring text to be processed;
    extracting subject words and entity words corresponding to the subject words from the text;
    establishing a subject relationship network according to a concerned object, to group the subject words into different subject word groups;
    identifying at least two of the extracted entity words that reference a same concerned object based on the different subject word groups; and
    generating amendment suggestions according to occurrence positions of the identified entity words that reference the same concerned object in order to insert embedded advertisement to the text.

* * * * *